United States Patent
Färnlöf et al.

(10) Patent No.: US 11,277,469 B2
(45) Date of Patent: *Mar. 15, 2022

(54) EFFICIENT AND RELIABLE HOST DISTRIBUTION OF TOTALLY ORDERED GLOBAL STATE

(71) Applicant: NASDAQ TECHNOLOGY AB, Stockholm (SE)

(72) Inventors: Patrik Färnlöf, Lidingö (SE); Robert Adolfsson, Vega (SE)

(73) Assignee: NASDAQ TECHNOLOGY AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/078,874

(22) Filed: Oct. 23, 2020

(65) Prior Publication Data
US 2021/0044649 A1    Feb. 11, 2021

Related U.S. Application Data

(63) Continuation of application No. 15/631,667, filed on Jun. 23, 2017, now Pat. No. 10,819,773, which is a
(Continued)

(51) Int. Cl.
*H04L 29/08* (2006.01)
*H04L 67/10* (2022.01)
(Continued)

(52) U.S. Cl.
CPC ............. *H04L 67/10* (2013.01); *G06F 9/542* (2013.01); *G06F 9/544* (2013.01); *H04L 43/08* (2013.01)

(58) Field of Classification Search
CPC ......... H04L 29/08; H04L 43/08; H04L 67/10; H04L 12/26; G06F 9/44; G06F 17/30; G06F 1/04
(Continued)

(56) References Cited

U.S. PATENT DOCUMENTS 5,506,966 A * 4/1996 Ban .................. G06F 9/546
                                                 709/207
7,765,561 B1   7/2010 Ellis
(Continued)

FOREIGN PATENT DOCUMENTS

WO          97/29436      8/1997
WO       WO-9729436 A1 *  8/1997 ............... G06F 9/52

OTHER PUBLICATIONS

Babaoğlu, Ö., et al., "Consistent Global States of Distributed Systems: Fundamental Concepts and Mechanisms," Technical Report UBLCS-93-1, Laboratory for Computer Science, University of Bologna, Jan. 1993.
(Continued)

*Primary Examiner* — Tauqir Hussain
(74) *Attorney, Agent, or Firm* — Nixon & Vanderhye P.C.

(57) ABSTRACT

An asynchronous distributed computing system with a plurality of computing nodes is provided. One of the computing nodes includes a sequencer service that receives updates from the plurality of computing nodes. The sequencer service maintains or annotates messages added to the global state of the system. Updates to the global state are published to the plurality of computing nodes. Monitoring services on the other computing nodes write the updates into a locally maintained copy of the global state that exists in shared memory on each one of the nodes. Client computer processes on the nodes may then subscribe to have updates "delivered" to the respective client computer processes.

21 Claims, 10 Drawing Sheets

Related U.S. Application Data continuation of application No. 14/560,423, filed on Dec. 4, 2014, now Pat. No. 9,712,606.

(60) Provisional application No. 62/001,616, filed on May 21, 2014.

(51) Int. Cl.
 *G06F 9/54* (2006.01)
 *H04L 43/08* (2022.01)

(58) Field of Classification Search
 USPC .................................................. 709/203, 202
 See application file for complete search history.

(56) References Cited

U.S. PATENT DOCUMENTS

| | | | |
|---|---|---|---|
| 8,499,029 | B1 | 7/2013 | Arimilli |
| 8,966,457 | B2 | 2/2015 | Ebcioglu |
| 2005/0091439 | A1* | 4/2005 | Mohideen ............ G06F 12/109 711/1 |
| 2007/0204271 | A1 | 8/2007 | Gaiarsa |
| 2008/0114943 | A1 | 5/2008 | Holt |
| 2009/0177772 | A1* | 7/2009 | Guan ................ H04L 61/1582 709/224 |
| 2010/0161705 | A1 | 6/2010 | Arimilli |
| 2011/0016153 | A1 | 1/2011 | Atta |
| 2013/0275285 | A1 | 10/2013 | Venkataraman |
| 2015/0067306 | A1 | 3/2015 | Henry |
| 2015/0341422 | A1 | 11/2015 | Farnlof et al. |

OTHER PUBLICATIONS

Goldberg, A. P., et al., "Restoring Consistent Global States of Distributed Computations," Distributed Systems Software Technology Group, 1991.

Gomez, R., et al., "Using Lamport's Logical Clocks to Consolidate Log Files from Different Sources," Innovative Internet Community Systems Lecture Notes in Computer Science, 2006, vol. 3908, pp. 126-133.

Gunaseelan, L., et al., "Event Ordering in a Shared Memory Distributed System," Proceedings of the International Conference on Distributed Computing Systems, May 25-28, 1993, pp. 256-263.

International Search Report issued in International Application No. PCT/SE2015/050585 dated Oct. 5, 2015.

Preiβinger, J., et al., "Fundamentals for Consistent Event Ordering in Distributed Shared Memory Systems," Instiut für Informatik, date unknown.

Written Opinion issued in International Application No. PCT/SE2015/050585 dated Oct. 5, 2015.

Zeng, Y., et al. "Characterization and Delivery of Directly Coupled Causal Messages in Distributed Systems," Future Generations Computer Systems, vol. 20, 2004, pp. 171-178.

\* cited by examiner

EFFICIENT AND RELIABLE HOST DISTRIBUTION OF TOTALLY ORDERED GLOBAL STATE

CROSS-REFERENCE TO RELATED APPLICATION(S)

This application is a continuation of Ser. No. 15/631,667, filed Jun. 23, 2017, now allowed; which is a continuation of U.S. application Ser. No. 14/560,423 filed Dec. 4, 2014, now U.S. Pat. No. 9,712,606, issued Jul. 18, 2017; which claims the benefit of U.S. Provisional Patent Application No. 62/001,616, filed on May 21, 2014, the entire contents of each of which are hereby incorporated by reference.

TECHNICAL OVERVIEW

The technology herein relates to distributed computing systems. More particularly, the technology herein relates to multi-host and/or multi-core scaling with causal delivery of messages with total ordering in an asynchronous distributed computing system.

INTRODUCTION

Distributing workload is an important aspect of modern life. For example, building an airplane involves many different people and processes working towards a common goal—constructing an airplane. It is possible that one person could construct the airplane, but the amount time it would take for such an endeavor would likely mean the plane is obsolete by the time it is finished. Similar issues occur when many smaller tasks need to be processed. For example, customers in a supermarket who are seeking to pay for their food do not just go through one checkout stand manned by one person, but are rather distributed among multiple checkout stands. By distributing the workload, the checkout process is quicker for customers. In short, workload distribution can decrease the time to complete a task (or a set of tasks).

In the area of computer technology, similar issues occur where computing processes can take one processor or computer far too long to complete. Distributed computing techniques seek to address such issues by allowing computers to answer or process questions that would otherwise be too large (or take too long) to process. For example, rather than have 1 computer answer a question in 100 years, 1000 computers (or 1000 processes working on 1000 different computers) can work to answer that same question in a month or two. Similarly, rather than one computer handling 1000 requests (for example, ordering books online), many computers can be programmed to handle such requests simultaneously.

Distributed computing is also relevant to real time data processing where large amounts of data are continually feed into a distributed system for processing (e.g., similar to the supermarket example above). For example, traffic information, weather information, electronic market data, operating systems, internet commerce applications, and other real-time data processes can benefit from distributed computing techniques.

An aspect in distributed computing of continued interest is understanding and addressing the ability of the various distributed computing processes to "see" the bigger picture or what other processes are doing within the disturbed computing system. Such problems are of interest because some applications operate with processes and events that are causally linked to each other. In other words, if process A generates event X and then event Y, and passes both of those onto process B, then process B should handle those events in the order that they were sent because the content of Y may depend on the content of X.

In a synchronous computing system, process B and A are controlled by a central clock that ensures B is not processed before A (e.g., because of a timestamp). In an asynchronous system, no such "real" clock is present—rather the components in the system operate independently of one another without a central clock. Asynchronous distributed computing systems can address this lack of a centralized clock by using what is known as a logical clock (or other similar techniques). Basically, the logical clock allows the causal precedence of events within the system to be maintained and tracked.

While maintaining such a complete causal ordering of all the events generated by the system (which therefore reflects the overall state of the distributed system) is possible, maintaining such information as the system becomes more and more complex (e.g., with more and more client processes) can be increasingly burdensome. Thus, it will be appreciated that new, more efficient, less resource intensive techniques in the area of distributed computing, especially asynchronous distributed computing are continually sought after.

SUMMARY

In certain example embodiments, a distributed computing system includes a plurality of computing nodes (sometimes called hosts) that operate asynchronously. The computing nodes may include computing systems, processors within a computing system, and/or cores within a processor. Each one of the computing nodes within the system includes a service (which can be computer software programs that execute on host computing node hardware or specialized hardware circuits of the host computing node). The service is being executed by the local hardware of the host and acts as a mediator between other hosts in the distributed system and plural client computer processes (referred to as client or clients herein) operating on a corresponding host.

Services are divided into a sequencer service and monitor services. Each service of a given host (e.g., both sequencer and monitor versions) is responsible for receiving electronic data messages generated by clients on that same host and sending those messages to the sequencer service to be added to the global state of the distributed system. The electronic data messages are added to the global state once they have been annotated with a global logical clock sequence number (e.g., that uniquely identifies the message within the distributed system). The historical sum of such annotated messages is referred to as the "global state" of the distributed computing system.

Once an electronic data message is annotated and added to the global state, each service receives (as new messages are added) and maintains some or all of the global state in memory local to the host for that service. The services of the respective hosts are responsible for notifying (e.g., via placement of the message into a shared memory location on the host) any of the clients on their corresponding host that a newly added message is available.

The totally ordered global state of the distributed system is comprised of generated events or messages (sometimes referred to as a global history or "run"). This global state is also composed of the various local states of each one of the client processes that are spread across the multiple computing nodes within the system. In other words, the global state of the distributed system is based on the messages generated from client process, whose local states are the sum total (e.g., history) of those generated messages. The service on each of these nodes acts to provide updates between the distributed system at large and the various ones of executing client processes.

In certain example embodiments, the reliable causal delivery and extraction of a subset of the maintained totally ordered state in the asynchronous distributed computation is ensured on the host level by using host reliable communication (e.g., shared memory and/or signals) to distribute a subset of the maintained totally ordered state to respective processes on a given host.

Such techniques can avoid the delivery, processing, and discarding of unwanted parts of the totally ordered state by the processes on the host (e.g., because some updates are not relevant for some processes) and can facilitate efficient multi-core processing (e.g., as each process is not continually parsing and interrogating the full extent of the global state). This technique is further facilitated by the lossless causal delivery guarantee of this host delivery mechanism (e.g., because communication occurs over the system bus or other internal circuitry of the computing node).

Centralizing message receiving and sending to a single process (e.g., the service) on each host minimizes contentions on shared network I/O resources and can be used to can gain exclusive access (e.g., by the service) to the resource (e.g., the network I/O resource) and achieve increased throughput and decreased latency.

In certain instances, computing resources (e.g., those on a given host) used for reliable causal delivery and distributed computation processing are separated. This separation can remove contention on shared resources used for receiving and sending of messages resulting in higher throughput and lower latency. For example, one core of a multi-core processor may be dedicated to handling and maintaining a local copy of the global state of the distributed system (e.g., receiving messages from a sequencer, notifying on-host clients regarding new messages, etc. . . . ). Other cores of a multi-core processor may be assigned to client process that receive newly added messages of the global state.

In certain examples, one of the nodes (and the corresponding service on that node) is designated as sequencer. The computing node configured as a sequencer in the distributed system may allow processes local on that node to directly consume subsets of the totally ordered state. This can further increase throughput and decrease latency for these processes.

In certain example embodiments, failover protection is provided where any other service (e.g., a monitor service) of any one of the computing nodes may be elected or designated as the sequencer for the distributed system. Accordingly, if the computing node that is hosting the sequencer service fails, another computing node may take over the role as the sequencer for the distributed system. In certain example embodiments, the resilience of the global state of the system is a function of the number of computing nodes within the system (e.g., because each node can become a sequencer) and/or the redundancy associated with how the global state is stored within the distributed system between the various computing nodes.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1A:
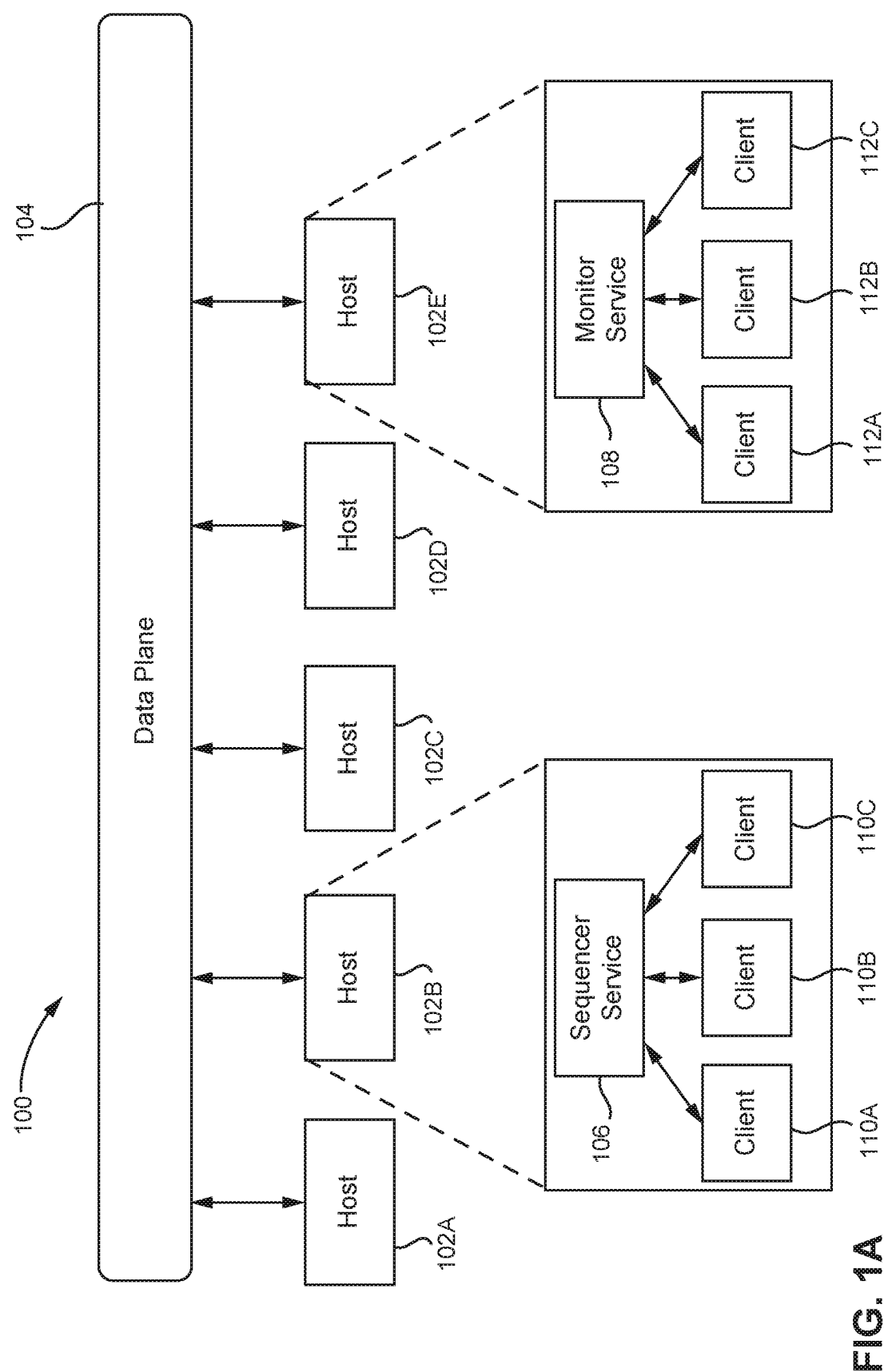
FIG. 1A is a block diagram showing an example distributed computing system according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function or process blocks are shown in the figures (e.g., FIGS. 4 and 6). Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). Software program instructions and data may be stored on non-transitory computer-readable storage medium and when the instructions are executed by a computer or other suitable processor control, the computer or processor performs the functions.

Although process steps, algorithms, or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, steps or functions may be performed simultaneously (or in parallel—e.g., a message is simultaneously broadcast across the network and stored locally on a host computing node) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM to a processor; (ii) or instructions for a process may be stored in an instruction register and loaded by a processor. Instructions and/or data may be carried over other types of transmission medium (e.g., wire, wireless, optical, etc.) and/or transmitted according to numerous formats, standards or protocols, such as Ethernet (or IEEE 802.3), SAP, ATP, Bluetooth, and TCP/IP, TDMA, CDMA, 3G, etc.; Such transitory signals may be coupled to non-transitory media (e.g., RAM, a receiver, etc), thus transitory signals will be coupled to non-transitory media. The transitory and non-transitory signals, instructions, and/or data, may be encrypted to ensure privacy or prevent fraud in any of a variety of ways well known in the art.

Distributed Computing System

Figure 2:
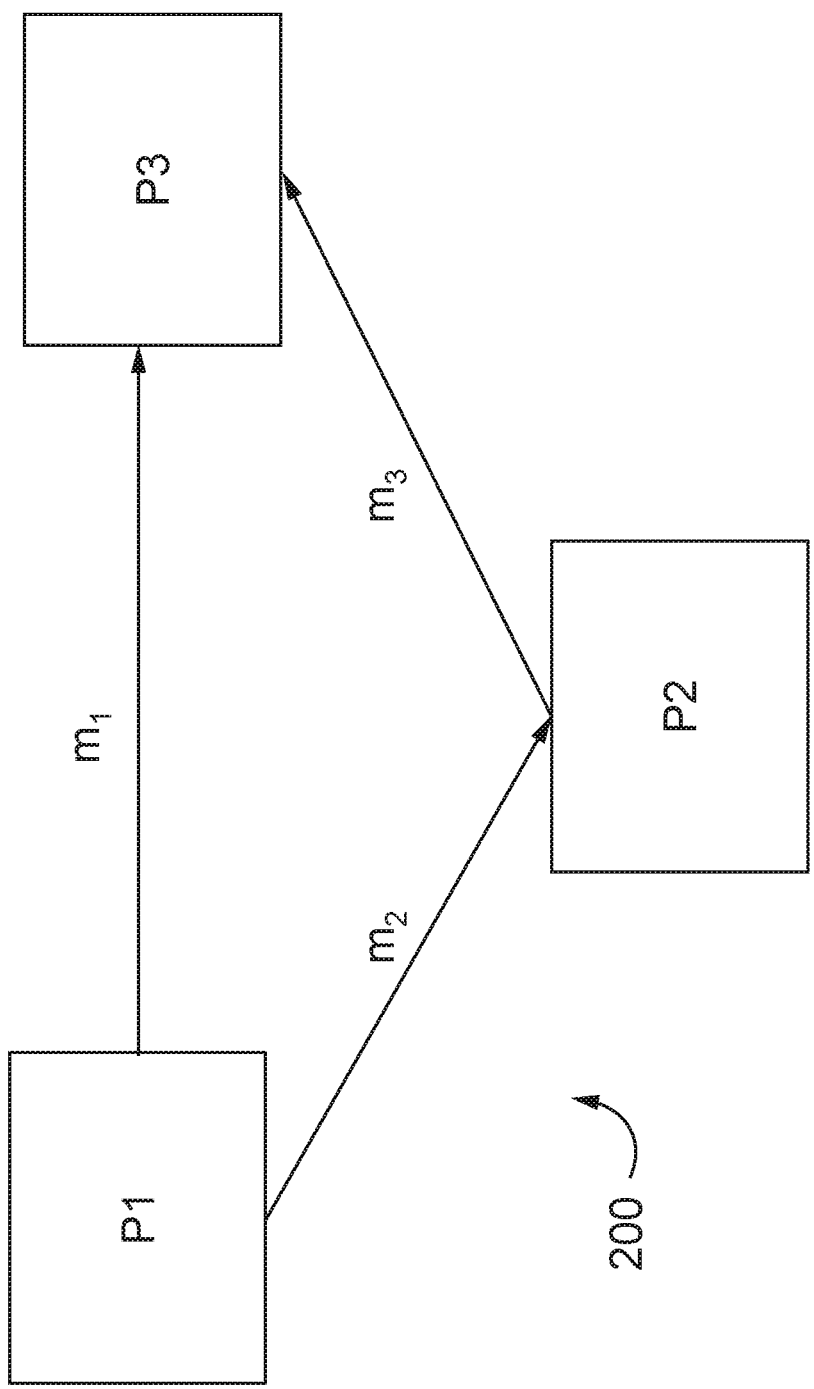
FIG. 2 is a block diagram showing how messages may be causally linked according to certain example embodiments.

An aspect in distributed computing is the concept of causal ordering. Specifically, messages sent between the various computer processes of a distributed system are causally ordered when the causal relationship between messages sent by a given computer process is maintained for reception or subsequent processing of those same messages. FIG. 2 shows an example of this concept. Suppose an example distributed system 200 includes computer processes P1, P2, and P3. P1 generates data messages M1 and M2 where M2 is causally dependent on M1 (or at least it may be inferred that M2 is causally dependent on M1). Thus, for processes where these messages have a common destination (e.g., P3), the received messages must be processed according to their causal order. Here, for the causal ordering to be maintained, M3 (which is sent via P2 based on M2) must be processed by P3 after M1 is processed. If M3 is processed first, then the causal ordering is broken. Accordingly, maintaining the relationship between messages as those messages move throughout a distributed system may be advantageous.

Such techniques may employed in example distributed systems described herein. For example, a client generates two messages, M1 and M2. A sequencer of the distributed system must process these messages according to their causal ordering (rather than the order in which they arrive at the sequencer). Similarly, when a monitor service receives annotated messages sent from the sequencer service, the monitor service may only add messages to the local store of the global state when the causal ordering is maintained. In other words, if M1 and M2 are messages that have been inserted into the global state, the monitor service will not add M2 to its local store before M1 is added. The maintenance of such causal ordering at the host level (as opposed to the process or client level), decreases the overhead of each client because when a client access the local store, the host level service can guarantee the causal ordering of its local version of the local state.

Additional explanation of the concepts and terms discussed herein can be found in "Consistent Global States of Distributed Systems: Fundamental Concepts and Mechanisms" by Ozalp Baboglu and Keith Marzullo, Technical Report UBLCS-93-1 (hereinafter Ozalp), January 1993, the entire contents of which are hereby incorporated by reference.

FIG. 1A is a block diagram showing an example asynchronous distributed computing system 100 according to certain example embodiments. System 100 includes hosts 102A, 102B, 102C, 102D, and 102E. Each host within the distributed system is a piece of computer hardware that can include computing systems (e.g., a microprocessor with associated memory and other corresponding components), processors within a computing system, and/or cores within a processor. In certain preferred embodiments, a host includes at least one computer hardware processor with multiple "cores." An example computer processor may be, for example, the Intel® Xeon E7-8895 microprocessor that has 15 cores and over 30 megabytes of shared onboard cache memory (which is the last level of cache on the microprocessor chip).

Each host has one or more clients (e.g., software modules, computer applications, software code, etc. . . . ) that is executed on the host computer hardware. For example, host 102B has clients 110A, 110B, 110C and host 102E has clients 112A, 112B, and 112C. The clients may be similar software modules or different depending on the needs of the distributed system. For example, clients 110A, 112A, and 112B may be the same software modules (e.g., executing the same or similar code structure on respective computer hardware) while clients 110B, 110C, and 112C are all different software modules.

Each client maintains or generates what is known as a local history or local state. For example, the local history of client 112A (e.g., a software process being executed) may be a sequence of events $(e_1, e_2, e_3, \ldots e_n)$. This sequence can provide inferential knowledge about the "state" of the client. This information, when combined with other local histories, can be used as view of the "state" of the distributed system—e.g., the sum total of events (messages) that have been added or processed by the distributed system. Note that the history in this sense does not necessarily mean (or even attempt to provide) a relative timing between the events, but rather provides information on causal nature of the events. Such causal information is kept track of by means of a logical clock that is incremented when there is an internal event, an event is sent (e.g., to another process as a message), an event is received from another process (e.g., a message is received), or other operation. In the case of reception of a message, the logical clock maintained by the client may be incremented to be, for example, one greater than the logical clock of the received message. As the causal order of events for the clients is maintained, it can be used as a basis for building a global history of the entire distributed system. Additional discussion of this technique is provided in the Ozalp reference.

The local histories maintained by each process are correspondingly sent (e.g., the events or messages of those histories) and make up a global state of the distributed system. In certain examples, clients may maintain the local histories (e.g., in a buffer or onboard memory). In other examples, the local history of a client is the sum of messages/events generated, sent, received, etc. . . . from that client regardless if the client stores all of the messages.

The global history of the distributed system 100 may be distributed via the data plane 104 (e.g., an electronic data communications network that allows hosts to communicate with one another). In other words, the data plane may allow hosts to access a totally ordered and consistent run of the distributed system 100.

While each client publishes (or otherwise sends) its respective local history (e.g., it publishes updates to the local history, such as when a new message is generated) to the system, a sequencer service 106 present on one of the hosts (host 102B in this example) acts as a receiver for those sent local history messages. The sequencer service 106 is configured to (e.g., by a corresponding software or hardware module) update the received messages with the monotonic logical clock (e.g., that is global to the distributed system 100) and insert the updated messages into the global history of the distributed system 100. Each added message is then immediately published via the data plane 104 so that monitor service(s) 108 can be updated as to the new global "state" of the distributed system.

Monitor service 108 exists on each one of the hosts in the distributed system (except the host that includes the sequencer). To summarize, one of the hosts is programmed to operate as a sequencer to receive local history messages published by the clients will other hosts are programmed to monitor the system for newly added global state messages that have been published by the sequencer. Thus, all of the hosts in the distributed system include a host-level service (e.g., there is one service on each host computing node within the distributed system), which may be a monitor service or the sequencer service. As explained herein, the monitor service and the sequencer service may share similar functionality (e.g., serving clients on the same host, maintaining a local copy of the global state, etc. . . . ).

Figure 1B:
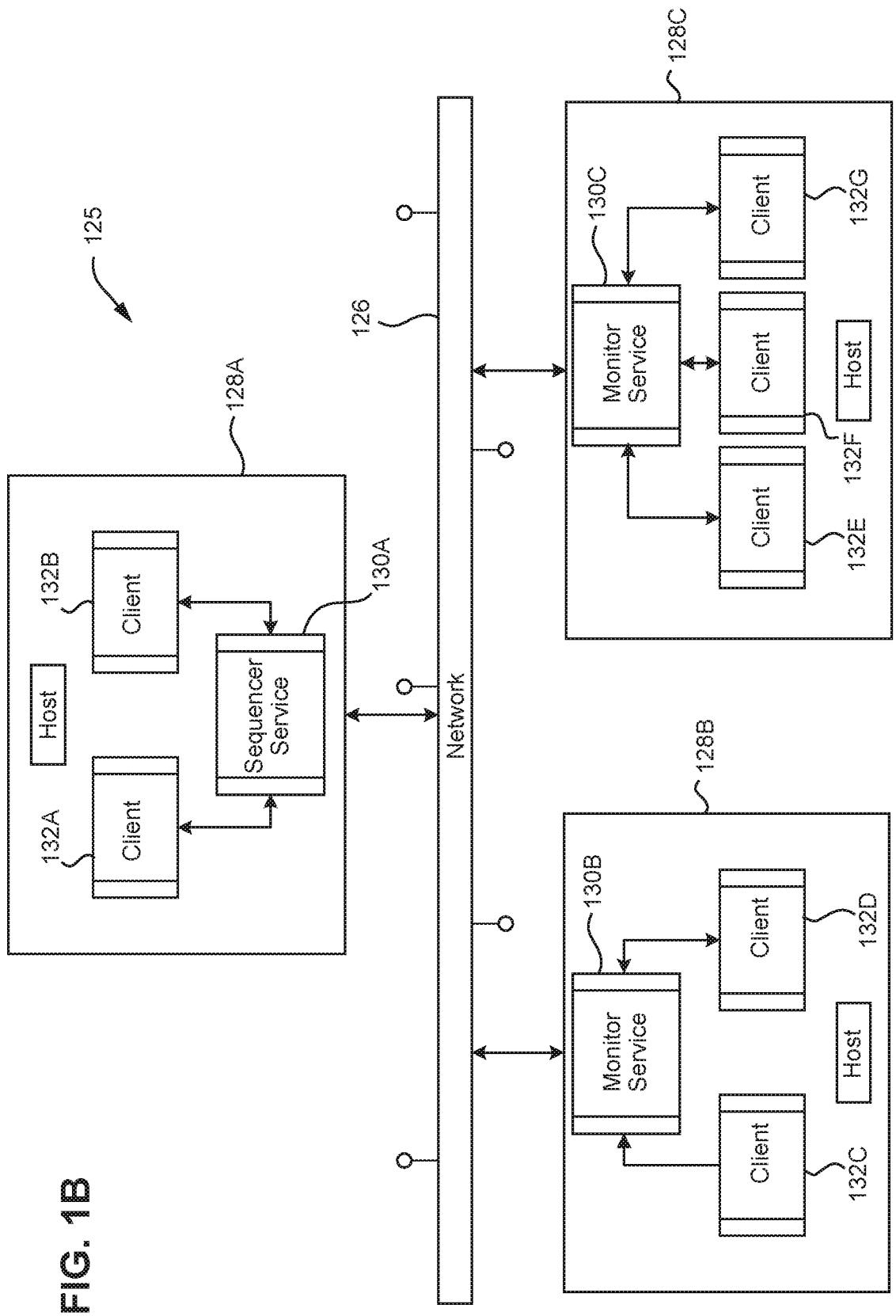
FIG. 1B is another block diagram showing an example distributed computing system according to certain example embodiments.

FIG. 1B is another block diagram showing an example distributed computing system according to certain example embodiments. Some of the elements in FIG. 1B may be similar to those in FIG. 1A. Distributed system 125 includes hosts (e.g., computing nodes) 128A, 128B, and 128C that communicate with each other via electronic data network 126. Electronic data network 126 may be composed of copper cabling and appropriate connectors (e.g., Category 5, 6, 7, 8, etc. . . . connectors) and/or optical fiber cabling (with appropriate connectors) along with a suitable network protocol (e.g., Ethernet) for transporting electronic data messages between hosts connected to network 126. Other types of networking techniques may be used to allow hosts to communicate with one another (e.g., wired or wireless techniques)

Hosts 128A, 128B, and 128C are computer hardware devices programmed to carry out certain functionality (e.g., automatically). Such computers generally include a central processing unit coupled to electronically accessible storage (e.g., a hard drive, RAM, cache memory, registers, etc. . . . ). A central processing unit (sometimes referred to as a processor or hardware processor herein) includes a control unit and an arithmetic logic unit. The arithmetic logic unit (ALU) performs arithmetic and logical operations while the control unit instructs (e.g., based on hardwired or micro-coded instructions) the ALU how and with what (e.g., from the memory) data to operate on.

Hosts 128A, 128B, and 128C also include various computer programs, processes, or services being executed (or that can be executed) by the respective host. Host 128A includes sequencer service 130A that receives, directly or indirectly, messages from individual clients (e.g., any of the clients 132A, 132B, 132C, 132D, 132E, 132F, 132E in FIG. 1B) and formats or annotates the received message into the global state of the distributed system 125. Messages newly inserted into the global state are broadcast across network 126.

Hosts 130B and 130C execute a monitor service which monitors network 126 for transmissions that indicate a new message has been inserted into the global state of distributed system 125. Upon reception of these messages, the monitor service on the respective host may add the message to its local store of the global state (e.g., a whole or partial set of the global state).

Clients that operate on a given host may then access the locally stored version of the global state. As the monitor service (or the sequencer service) ensures the local version of the global state is consistent, clients do not need to worry about maintaining or checking if a message is properly ordered within the global state.

Access to the local store may be performed via shared memory techniques or other suitable techniques that allow for reliable and/or lossless communication between computer processes that are executing on the same computing node (e.g., inter-process communication).

Clients can interact with data local to the respective host and/or may be clients that act as a gateway or interface to external computer systems.

An example client may receive a video stream from an external source and perform object recognition on that video stream (e.g., to identify certain objects within the received images). One client may accept multiple video streams and process each, for example, on a separate thread of the client. Alternatively, each client may accept one video stream and preform operations against that video stream. Each time an object is recognized in the video stream a message may be generated and sent to the distributed system for inclusion into the global state.

In another example, a client may be a matching and/or order book engine of an electronic trading exchange. Data stored in the onboard memory of the host running such a client may include a list of orders to be matched. Messages generated by this type of client may include messages that indicate orders have been matched or that an order has been successfully received by the exchange.

In another example, a client may act as a gateway to receive orders from external sources. For example, an order may be received to buy or sell a particular financial instrument listed on an electronic trading exchange. The client that receives this order may format the request for the order and generate a message that is eventually inserted into the distributed system (e.g., its global state). A further message may be generated (and inserted into the global state) in response (e.g., from an order book engine) that confirms the order has been placed. A client on one of the hosts may then receive this message and send a confirmation to the external computing system.

In another example, a client is programmed to receive sensor readings (e.g., temperature, barometric pressure, etc. . . . ) and insert such readings into the distributed system. Another client (or multiple clients) may be used to execute a forecast simulation using such data.

In another example, a client receives shipping data related to the manufacturing of a complex piece of equipment (e.g., an airplane, a car, semiconductors, etc. . . . ). Another client receives information on production processes while another receives safety test results. These clients generate messages that are inserted into the global state of the distributed system. A further client then operates on these messages to forecast production output for a particular manufacturing plant.

In short, the uses for the example distributed computing systems described herein are not confined to particular fields of use, but may be implemented for many different types of environments.

Figure 3:
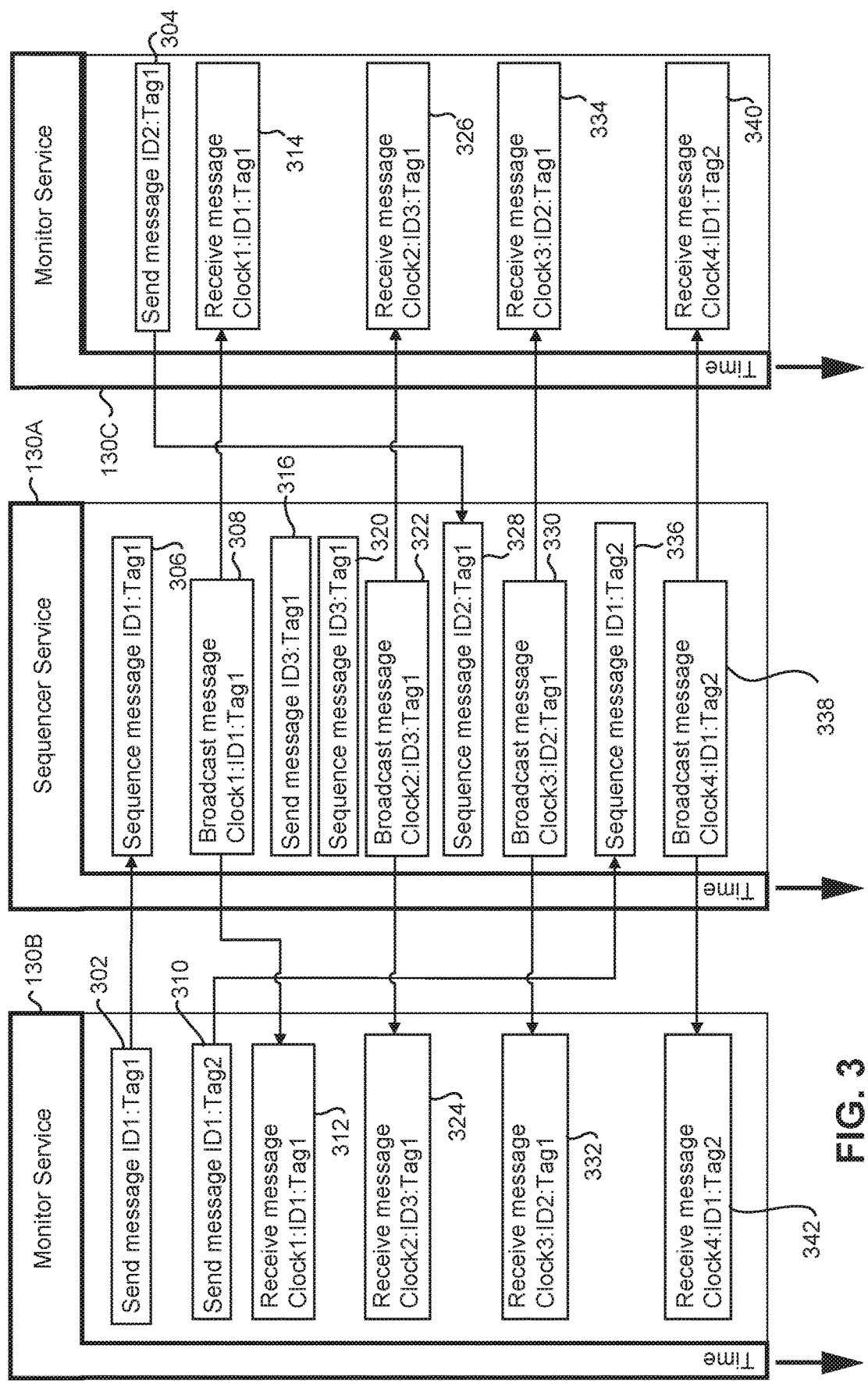
FIG. 3 is a messaging diagram that shows communication and processing of messages in a distributed computing system according to certain example embodiments.

FIG. 3 is a messaging diagram that shows communication and processing of messages in the distributed computing system of FIG. 1B. As discussed herein, messages inserted into the global state of the distributed system may be generated by clients within the system. In FIG. 1B, messages generated by clients, but not yet inserted into the global state (e.g., have not yet been annotated or formatted by sequencer service 130A) may include two fields that identify the message within the distributed system. A first field is an "ID" field that identifies the client that generated the message. In certain examples, the identifier for the client is unique throughout the distributed system (e.g., every client has a different identifier). For example, the client that generated message 302 has an ID of "1."

The "Tag" field within a message is a local logical clock sequence identifier for that particular client. In other words, each client (or the host-level service associated with that client) can maintain and use a local logical clock for each individually generated client message. Thus, message ID1:Tag2 can be said to be causally dependent upon message ID1:Tag1.

Messages inserted into the global state of the distributed system include a "Clock" field. For example, the message at 308 includes an ID field, a tag field, and a clock field. The clock field is the sequence number of the global logical clock for that particular message.

Naturally other header and/or body information (e.g. the content of the message) may be included. In certain examples, a timestamp (e.g., based on a local real-time clock of the particular computing system) may be added to the header of the respective messages.

The content of the messages may vary based on application and design requirements. For example, a message may include content that specifies that a particular sensor recorded a wind velocity of 30 kph at 3:24 AM. Another message may include an electronic order message to buy (or sell) a particular instrument that is listed on an electronic trading exchange.

In certain examples, the body of the message may include a pointer to a computer storage location within the distributed system. For example, the distributed system may implement a distributed file system (DFS) and the pointer may allow clients to access the stored information through the DFS. For messages with larger payloads (e.g., a video, an image, a large dataset, etc. . . . ) this may allow for faster processing and decreased usage of network bandwidth as the content of the message may be irrelevant to the sequencer service and its logical location within the global state of the distributed system.

Referring more particularly to FIG. 3, client "1" (i.e., assigned an identifier of "1") is located on the same host computer system as monitor service 130B. Monitor service 130B receives a message at 302 (e.g., has been generated by client "1") and transmits the message via the network to the sequencer service 130A (e.g., a sequencing queue that is maintained by the distributed system and/or the sequencer service 130A). A message generated by client "2" on another host is similarly sent at 304 to the sequencer service 130A. Sequencer service 130A receives message (ID1:Tag1) at 306 and sequences the received message. The sequenced message includes a logical clock sequence number ("1"). The sequencing results in a new or annotated message at 308 that is broadcast over the network of the distributed system where monitor service 130B and monitor service 130C receive the broadcast message at 312 and 314.

Sequencer service 130A receives a new message from a client executing on the same host computer as the sequencer and sends the message to the sequencing queue at 316. The sequencer service annotates this message (ID3:Tag1) to generate a new message that is then broadcast at 320. The broadcast message includes sequence number "2" for the logical clock of the distributed system. Monitor services 130B and 130C receive the broadcast annotated message (Clock2:ID3:Tag1) at 324 and 326 and add the received message to their respective local global state message stores.

Sequencer service 130A receives the message (ID2:Tag1) sent from monitor service 130C at 328 and sequences it at 328. This new message is broadcast at 330 over the network where it is received by monitor services 130B and 130C at 332 and 334.

Sequencer service 130A receives another message, which was earlier transmitted from monitor service 130B, and sequences at 336. The sequenced message is then broadcast at 338. This message (Clock4:ID1:Tag2) is broadcast to monitor services 130B and 130C and received by those services at 342 and 340.

Figure 4:
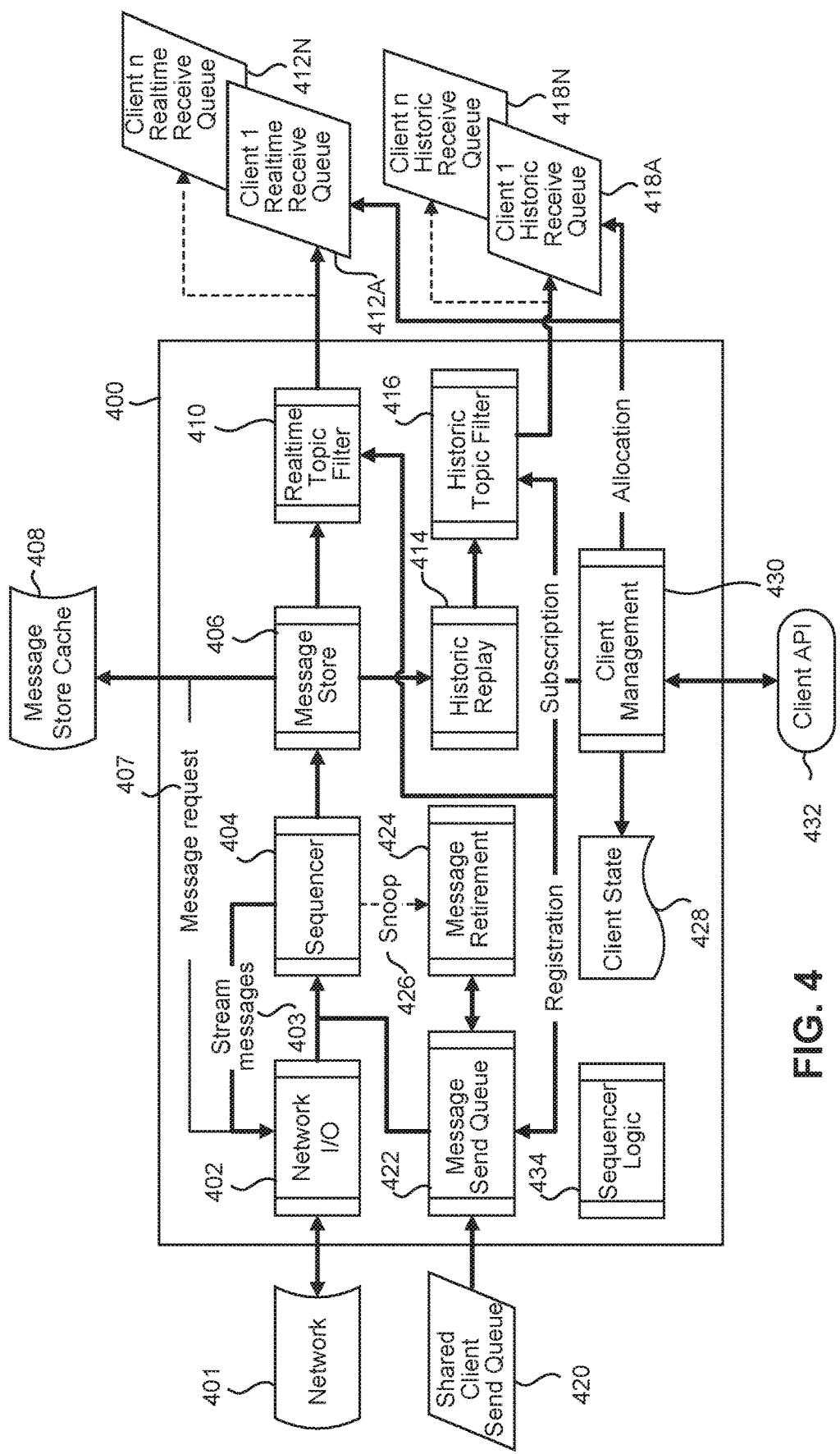
FIG. 4 is a block diagram of a sequencer according to certain example embodiments.

FIG. 4 is a block diagram of a sequencer service according to certain example embodiments. Sequencer service 400 is a computer process with one or more threads (or other processes) programmed to execute on a host computing node. The functional blocks contained within sequencer service 400 are different subprograms, modules, or functions that make up the overall functionality provided by sequencer service 400. Each of the blocks may run as a separate process, a separate thread within the same process, or may share processes or threads. For example, message send queue block 422 and message retirement block 424 may execute on the same thread, while sequencer 404 may execute on its own thread. Further, while not strictly required, it is preferred that each of the functions within sequencer service 400 (or monitor service 600) be executed on the same host computer node and within the same computer process. In other words, it is preferred that communications between the function blocks of the sequencer service do not use network resources, but rather communicate via inter-process communication techniques or the like within a single computer node. As will be appreciated by those skilled in the art and as explained herein, example host computer nodes may include multiple processing units (e.g., CPU's and/or cores on CPU's) that have their own memory and/or share memory. It will also be appreciated that the functionality provided by the various modules or blocks of the sequencer service 400 may be implemented in hardware (e.g., a dedicated circuit) or software in combination with hardware (e.g., the software programming the hardware to operate in a certain way).

Network 401 is an external data communications network and may be, for example, network 126. Network input/output 402 communicates with a physical network interface (e.g., a network card—e.g., 918 in FIG. 9) that is part of the host computing node executing sequencer service 400. Network input/output 402 provides for sending and receiving network messages (which may include messages related to the global state of the distributed system) to/from network 401 of the distributed computing system.

Sequencer 404 sequences messages into the global state of the distributed system. For example, sequencer 404 annotates a message (or generates a new message based on a prior message) to include the "clock" field as discussed in FIG. 3. Messages to be sequenced can be received via network 401 (e.g., from other hosts) and/or via clients located on the host computing node running sequencer service 400. The functionality and operation of sequencer 404 is described in greater detail in FIG. 5.

Once a message is annotated with a logical clock sequence number it is effectively part of the global state for the distributed computing system. Sequencer 404 causes the annotated message to be streamed to other hosts on the network via stream operation 403. In other words, a request is sent to network I/O 402 to transmit or broadcast the annotated message out to the other hosts of the distributed computing system.

The annotated message is also stored to a local message store cache 408 via message store module 406. Message store 406 provides access to message store cache 408 that contains the totally ordered global history of the distributed system (e.g., the global state of the distributed system). In certain examples, the message store cache is located on disk (e.g., a hard drive), main memory, cache memory (e.g., on die), or some combination thereof. Message store 406 includes program code to provide direct memory access to message store cache 408 for clients on the respective host (e.g., via memory mapping or other similar techniques).

In certain example embodiments, the message store cache may be configured to only store a partial subset of the global history. The amount or particular portion of the global state stored in a message store cache may be determined by the needs of the clients executing on a given host. In other words, if some portion of the global state (e.g., certain types of messages) is not relevant to any of the clients on the host computing node, then that portion may not be locally stored by the given host.

If there is a portion of the global history of the distributed system that is not stored in the message store cache, then the message store 406 may issue a message request 407. Message request 407 causes a request to be sent through network I/O to ask other hosts within the distributed system to supply the requesting host with the message that it does not have. Once received, message store 406 may add the message to message store cache 408 and, as needed supply the message to the local clients.

In certain examples, all of the global history is stored on the host. Further, each host in the distributed system may store all of the global history, only some of the hosts may store all of the global history, or none of the hosts may store all of the global history. In certain instances, the overall redundancy of the system is based on the ability for any host to retrieve any portion of the global history at a given point in time. In other words, even if no host stores the entire of the global history, the system may still have sufficient redundancy as multiple hosts have overlapping portions of the global history. Thus, the failure of one, two, or three hosts may not result in loss of the total global history (e.g., all messages that have been generated) of the distributed system (e.g., as it may be reconstructed from multiple hosts in the system).

Real-time topic filter 410 is a filter and delivery service that provides messages to client queues 412A through 412N of the particular host computing node. Real-time topic filter 410 filters the messages that are to be provided to queues 412A through 412N based on previously defined client settings. For example, a client may be interested in messages that only have a client ID of "34" (e.g., from some other client that is executing in the distributed system). Real-time topic filter will then deliver a notification to the queue for that client when messages with a clientID of 34 are received from the sequencer. In certain examples, the notification includes a memory pointer to the location in the message store cache 408. In other examples, the notification includes a copy of the message (or the data in the message) that is placed into the selected queue for use by a corresponding client.

Other types of filtering options may be employed. For example, each client may subscribe to a certain "type" of message. The type of message may include messages from a selected client, messages that are associated with particular topics, messages that have a certain value, etc. For example, a client may register to receive notifications related to messages that have temperature readings that are above 40 degrees Celsius. The registration information for respective clients may be stored in client state 428.

In certain examples, each client maintains or has access to a queue of messages for that particular client. In certain examples, the queue is a first-in-first-out queue. Accordingly, as messages from the global state are added to the message store cache 408, real-time topic filter 410 will correspondingly deliver notifications to interested clients via at least one of real-time queues 412A to 412N.

As discussed herein, clients may generate messages to be added to the global state of the distributed computing system. When a client generates a message and that message is to be added to the global state, the client adds (e.g., writes) the message (e.g., message 302 or 316 in FIG. 3) to shared client send queue 420.

Shared client send queue 420 is a queue maintained and provided by the local host computing node (e.g., as a location in memory) and is accessible by the message send queue module 422. In certain examples, the shared client send queue 420 is located in shared memory of the local host computing node such that the sequencer service 400 and all of the local clients associated with that host may access (e.g., read from/write to) the shared client send queue 420 9 e.g., because the queue is a commonly accessible location in memory of the local host computing node).

For a given message in queue 420, the message send queue module 422 sends the message to sequencer 404, which sequences the message. When the message is sent to the sequencer for processing, the message send queue module 422 also stores the message to a local buffer that is managed by the message retirement module 424. The buffer is used to hold messages received from the clients, but not yet officially added to the global state of the distributed system. Once the message is properly sequenced and added to the global state (e.g., has been broadcast out via network 401), the sequencer will perform snoop process 426 on the buffer and the message will be retired or removed from the buffer via message retirement module 424. In other words, when new messages are sent to be sequenced, those message are temporally stored to a buffer or the like until the message is officially part of the global state of the distrusted system. Once the sequencer has added the message to the global state, the message can be removed from the maintained buffer.

As discussed herein, the buffer is used because messages may arrive at the sequencer in an out of order manner. When this occurs the out of order message is dropped by the sequencer 404 and will need to be re-added to the sequencer for sequencing. Accordingly, the message retirement module may maintain a timer for selected messages that are in its managed buffer and periodically retransmit messages that have not yet been added to the global state of the distributed system. Alternatively, or in addition, the sequencer may send a request to the host that originally sent the now dropped message. This request may trigger the selected host to resend the dropped message to the sequencer (e.g., as the message is stored in the buffer managed by the message retirement module 424).

Alternatively, or in addition, the sequencer may maintain its own buffer of out of order messages that may be used to quickly reinsert messages that arrived at the sequencer in an out of order manner. Alternatively, the sequencer may simply reinsert an out of order message at the "end" of its queue of messages to be processed. In another example, the reinsertion of the out of order message may occur after a period of time has expired.

It will be appreciated that the sequencer can either notify the message retirement module a message has been added to the global state or the message retirement module can watch the processing of the sequencer for those message that are stored in the maintained message retirement buffer. Furthermore, the programmatic processing of operations from sequencer 404 (e.g., whether via stream message 403, addition of a message to a local message store 406, or snoop operation 426) may be synchronously performed or asynchronously performed. In any event, once a message has been added to the global state, it may be removed from the temporary buffer by using message retirement module 424.

Historic replay 414 provides access to the message store cache 408 via message store 406 (historic replay may also be programmed for direct access to the memory that holds the message store cache 408). Historic replay 414 allows clients to see behind the real-time message flow of the global state. In other words, when a new message is added to the global state, a message that was previously added may be provided via the historic replay. Such programmed functionality allows clients to consume messages in a historic manner. Historic topic filter 416 operates in a manner similar to real-time topic filer 410, except with the historic messages.

One advantage that the filters provide (for both real time and historic) is that clients (and their associated queues) are not inundated with the entire scope of the global state, but may instead consume only those messages that are relevant to the selected client (e.g., via historic client queues 418A through 418N).

Client management module 430 provides an interface for current and potential clients to connect to the sequencer service 400 via client API 432. Client management module 430 may assign globally (to the distributed system) unique identifier for clients, allow clients to register with the sequencer service, allow clients to change what messages are of interest to the clients, allocate queue areas 412A for communicating with the clients (e.g., what portion of the hosts physical address space will be used for a given queue). Queues can be provided in shared memory so that both the sequencer service 400 and a client can access the queue.

Client state 428 in the sequencer service 400 is the stored settings for currently connected clients, their associated filter settings (e.g., what type of messages will be provided to the corresponding queue for that client), ID information, the location in shared memory for the queue for that client, the local logical clock for each connected client, etc. . . . .

Sequencer logic 434 provides administrative functions for sequencer service 400. This can include allocation of resources based on processing need (e.g., splitting functionality between threads or assigning processing cores of a host to particular functional elements or modules of the sequencer service). This may also include functionality for maintaining a distributed computing system. For example, voting logic to determine which host is to become the new sequencer in case of failure for a prior sequencer may be contained in this module.

Figure 5:
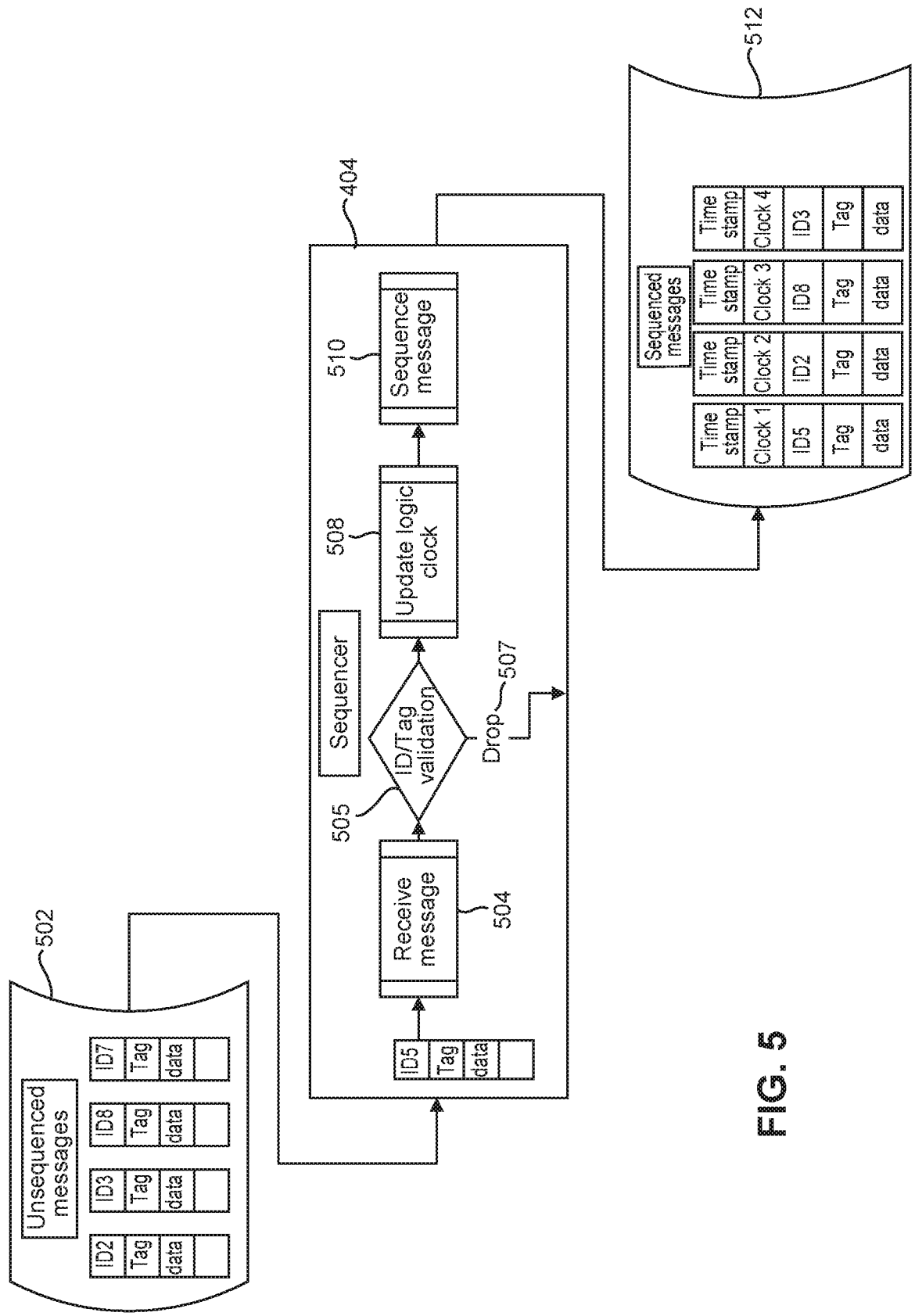
FIG. 5 is a flow chart of a process performed by a sequencer according to certain example embodiments.

FIG. 5 is a flow chart of a process performed by sequencer 404 in FIG. 4 according to certain example embodiments.

Unsequenced messages 502 are messages sent to the sequencer 404 for insertion into the global state of the distributed system. Messages 502 include an ID field that indicates where the message originates from, a tag field that is a logical clock value local to the client, and the payload or data for the message (which may be variable or fixed length depending on application need). Other types of fields may be included, for example a timestamp may be included.

Sequencer 404 receives a message at block 504 (e.g., via the network or via IPC on the host that includes the sequencer service 400).

In 505 the ID and Tag of the message that is to be sequenced is validated. Specifically, a validation rule is applied to ensure the logical sequence of messages from a given client is processed in the proper order. Thus, if the tagID (e.g., the logical clock sequence number) for a given client is one greater than the previously processed message for that client, the message is valid and ready to be sequenced. However, if the message has a logical clock sequence number that is out of bounds (e.g., a sequence number that is 2 more than the prior message), the message being operated on by the sequencer will be dropped at 507. The sequencer stores a counter associated with each processed message from each client and will thus effectively maintain a version of the logical clock for all clients in the distributed system.

When a message is dropped, the monitor (or sequencer) service that placed the message to be sequenced will eventually resend the message as message retirement 424 will determine the message has not been inserted into the global state (e.g., it will timeout). As noted above, other processes for handling out of order or dropped messages may be employed.

An example of a gap occurring in a local logical clock sequence is a message being dropped (e.g., corrupted, etc. . . . ) when being transmitted over the data communications network between hosts.

After validating the message, the logic clock of the distributed system is updated in 508 and then then unsequenced message is sequenced (e.g., annotated) with the updated logical clock sequence number at 510. In certain examples, a time stamp may also be applied to the sequenced message to indicate when (e.g., according to the RTC of the local host computer node). The resulting sequenced messages are shown in 512 and are, as discussed herein, broadcast out across the network to other hosts for consumption and storage.

Figure 6:
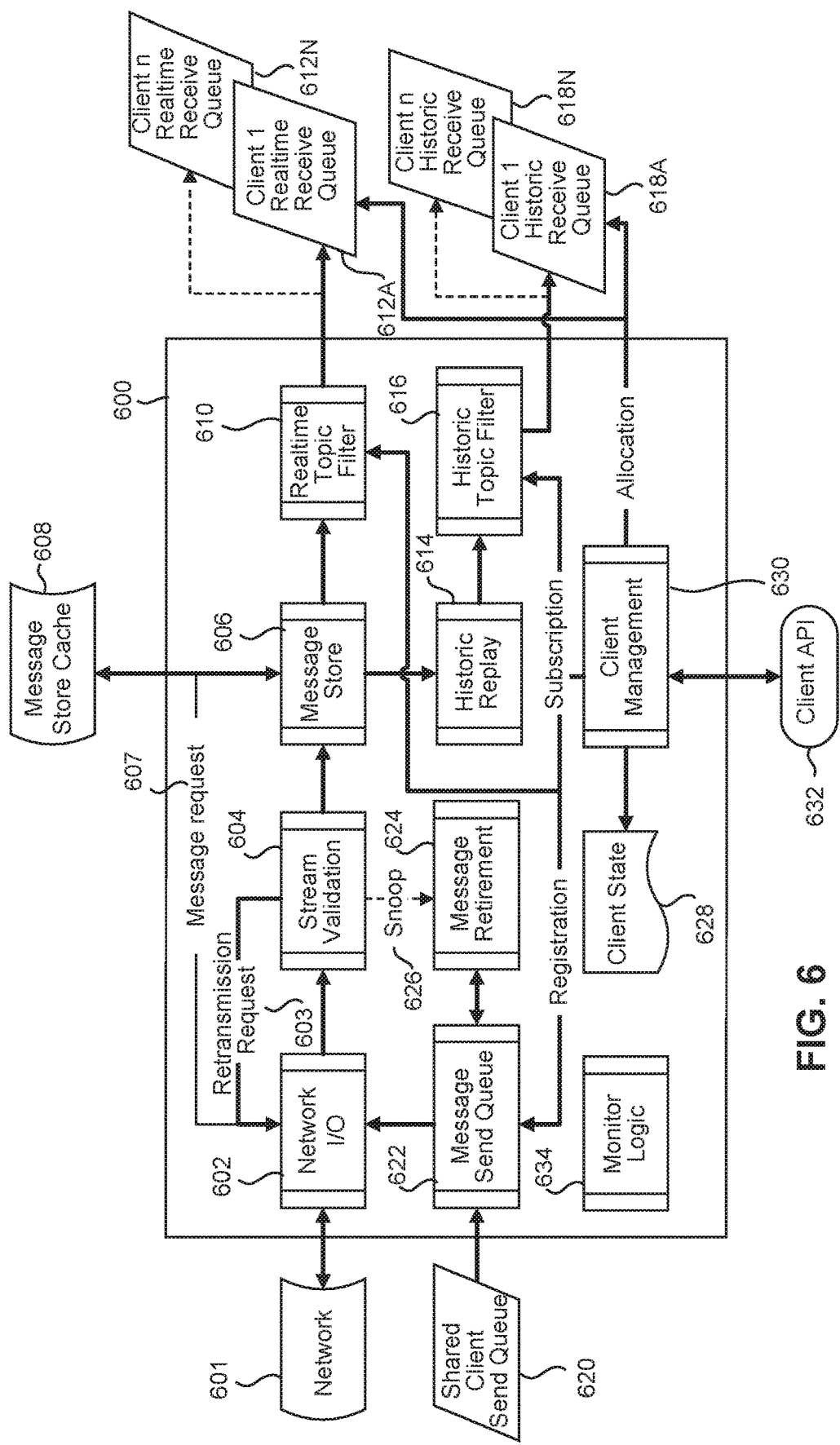
FIG. 6 is a block diagram of a monitor according to certain example embodiments.

FIG. 6 is a block diagram of a monitor service according to certain example embodiments. Many of the modules or functions in FIG. 6 are the same or similar to those in FIG. 4. In certain example embodiments, a host-level service is provided on all host computing nodes of the distributed system. The host-level service is configured to switch between a sequencer mode (e.g., FIG. 4) and a monitor mode (e.g., FIG. 6). Accordingly, one host may run the host-level service in a sequencer mode while the others run the host-level service in a monitor mode (e.g., as shown in FIG. 6). In certain examples, elements 601, 602, 606, 608, 610, 612A-612N, 614, 616, 618A-618N, 620, 624, 626, 628, 630, and 632 respectively correspond (in terms of functionality provided, but are different because they are located on different host computing nodes) to elements 401, 402, 406, 408, 410, 412A-412N, 414, 416, 418A-418N, 420, 424, 426, 428, 430, and 432.

Monitor service 600 differs from sequencer service 400 in that multiple hosts within the distributed system may be monitors, but only one sequencer service may be provided within the distributed system. Another way to view the relationship is that there are many consumers (the monitors) of the annotated message information, but only one producer (the sequencer). Elements that differ from sequencer service 400 are stream validation 604 (also described in connection with FIG. 7), retransmission request 603, and the process of transmitting messages received from local clients to the sequencer service. Monitor logic 634 may be different, but may also be the same as a given monitor may be called upon to become a sequencer (e.g., in case of failure of the host of the sequencer service).

Messages broadcast from the sequencer are received via network 601 and initially processed by network I/O 602. Received messages are then sent to stream validation 604 for validation. Those messages that are validated are sent onto to message store 606 and stored to message store cache 608.

As explained in greater detail below, if there are gaps in the logical clock of the received messages, monitor service 600 may send retransmission request 603 and ask the distributed system, via network 601, for the missing message (e.g., any host in the distributed system may supply the missing message). This process helps to ensure the network transmission of the messages from the sequencer to the monitors is reliable.

Messages received via shared client send queue 620 are processed by the message send queue module 622 and transmitted to the host running the sequencer service for insertion into the global state via network I/O 602. The other elements operation in manner that is similar or identical to that of sequencer service 400.

Figure 7:
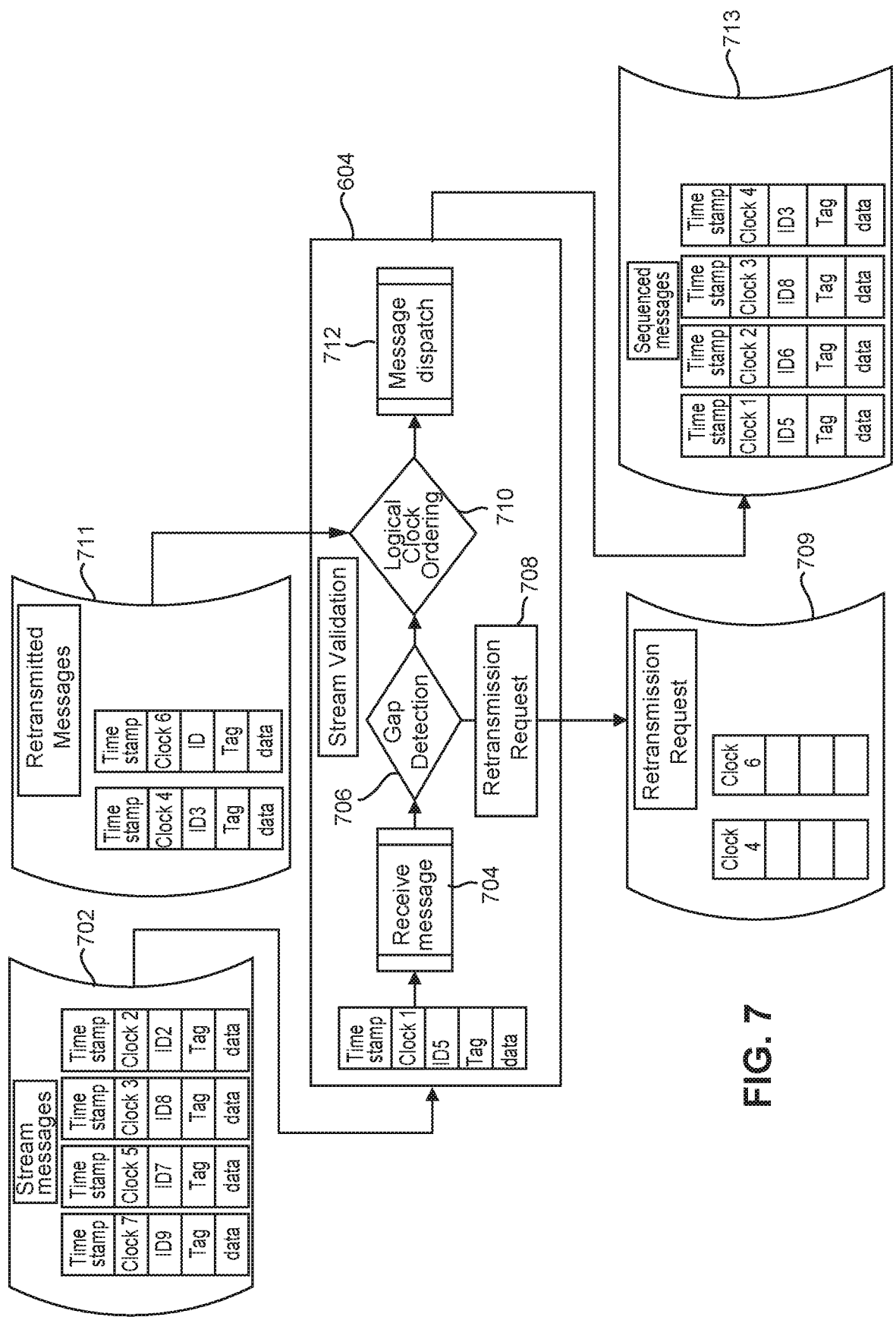
FIG. 7 is a flow chart of a process performed by a monitor according to certain example embodiments.

FIG. 7 is a flow chart of a process performed by a monitor service according to certain example embodiments. Stream messages 702 are messages of the distributed system global state and received by monitor service 600. A message is first received at 704, and then a gap detection process is performed at 706. The validation rule used to check for gaps checks if the current message has a sequence number that is one greater than the previously validated message. If the sequence number is one greater, then the message is properly ordered and will be processed.

If there is a gap in the global logical clock (e.g., the current message is not one greater than the previous), then a retransmission request is triggered at 708 for the missing message.

709 shows the retransmission requests that will be issued for the example shown in FIG. 7 (as Clock 4 and Clock 6 are not in the group of sequenced messages 702). After issuing the requests, the stream validation process proceeds to logical clock ordering at 710 and will allow messages to be dispatched at 712 as long as there is no outstanding gap in the global clock. When there is a gap in the logical clock, the process will block until the gap is filled. Gaps in the logical clock are filled via retransmitted messages 711 that are received in response to a retransmission request. Once messages 711 are received to fill in the gaps in the logical clock, the messages that were being blocked are released and dispatched to 713.

In the FIG. 7 example, clock 1, clock 2, and clock 3 will be processed normally and be immediately released. However, when the next message, clock 5 is processed, a retransmission request will be triggered for the missing clock 4. The process will then block at 710 until clock 4 is received in inserted into its corresponding gap. A similar process will occur when clock 7 message is processed and a request will be issued for clock 6.

In certain example embodiments, a distributed computing system includes a plurality of computing nodes that operate asynchronously. The computing nodes may include computing systems, processors within a computing system, and/or cores within a processor. The distributed computing system includes plural processes operating across the multiple computing nodes. In certain examples, one computing node may have many processes on that specific computing node. Generally speaking a computing node as used herein is a piece of computer hardware that virtually guarantees lossless and reliable communication between computer processes executing on that computing node. Such communication typically occurs over a system bus or the like and does not involve communications over an external communication network (e.g., network 126).

Each process within the distributed computing system includes a local history that is a sequence of events that have been, are being, or are to be operated on by that process. This sequence can be infinite (e.g., new events will be continuously processed). Each process orders the respective local history according to a local maintained logical clock (or similar technique). Each process in the distributed computing system publishes the respective local history (e.g., as it is updated in the form of individual messages, events, or commands) to make up a global history of events or messages that are present in the system. In certain instances, the global history of the distributed system may be referred to as a totally ordered and consistent run.

The ordering of the events in the local history of each process and within the global history is based on a logical clock used to order the events. In other words, the timing between events may not matter but rather the causal link between events or the cause-and-effect of those events may be used to order the events of the local and global histories.

Thus, the system orders two events in a given order when the occurrence of the first event may affect the outcome of the second event. Conceptually, information can flow from one event to another because two events are processed by the same process (e.g., they access the same local state of that process—e.g., a local variable or the like) or because the two events are being processed by different processes and a message is exchanged between the processes (e.g., the second event depends on the contents of the delivered message). In such circumstances, the events may be causally related.

Given the above, the global history maintained by the distributed system can satisfy a causally ordered delivery requirement for any computing node within the distributed computing system. Specifically, each node within the system monitors (e.g., by a monitor service on that computing node) the global history. As the local histories are causally ordered, the global history (which is composed of the local histories) is also causally ordered.

Another aspect of an example asynchronous distributed system is that one or more of the nodes within the system can be nominated or chosen to be a sequencer. The sequencer service can also include a monitor service (or can become a monitor) and is included as one of the computing nodes within the distributed system. The sequencer service is programmed or configured to receive local history publications or messages sent by the processes within the distributed system. The sequencer decorates received messages (e.g., the messages in the local history sent from each process) with the maintained monotonic logical clock and inserts the messages into the global history to produce the run R. The computing node that is hosting the sequencer then publishes (e.g., immediately upon update) the global history (e.g., the update to the history) to all of the monitors within the distributed system by reliable broadcasting.

In certain example embodiments, reliable broadcasting for the system is ensured whereby each computing node (e.g. host that includes a monitor service) requests messages when gaps in the monotonic logical clock are detected by queuing updates until the missing messages are received. For example, one of the hosts may request a message when it detects a gap in the logical clock of hits local version of the global state.

In certain example embodiments, each monitoring service on a computing node in the distributed system records incremental updates from the global history to shared memory for the respective computing node.

In certain example embodiments, a service on each computing node within the distributed system offers an interface whereby clients (e.g., processes that are running on that computing node) can subscribe to a subset of the global history (the "run") and to continuously receive updates of R (e.g., for that subscribed subset. Correspondingly, each process on the node that is using this interface is also a process in the distributed system that actively publishing its local history. Each update the local run for a given process is updated with the monotonic logical clock of that particular process.

In certain example embodiments, an increment of a local history of particular process is not part of the global history until it has been recorded into the global history. In other words, until a particular update of the local run of a process has been recorded a subsequent update of that local history cannot be made. Such an implementation may help to ensure the atomicity of a particular update as the update has to be retried until it becomes a part of the global history.

The resilience of the global history in the distributed system may be guaranteed because all of the hosts or computing nodes which have monitors of the global history can become new the sequencer service in the event of failure of the current sequencer. In certain example embodiments, the determination for which one of the hosts in the system is to be the new sequencer is based on the computing node whose monitor's "view" of the global history is the highest logical clock and priority. Such a host will unanimously "win" the vote and become the sequencer.

In certain examples, messages that are external to the system (e.g., hidden channels) may never be published from the host which currently acts as sequencer. This is because the reliability of the global history can be compromised if the node hosting the sequencer fails and the local updates regarding such an external message are not captured in the global history before the newly sequencer assumes its role in the system.

In certain example embodiments, the processes that are executing on a given computing node in the distributed system only process the subset of the monitored global history that is of interest to that process. Accordingly, a subset selection technique of the global history is provided which fulfills the causal delivery guarantee without needing to consume every update of global history that is monitored by that computing node. In certain examples, this is achieved by the monitor on the computing node guaranteeing the total ordering of the global history (despite any out-of-order delivery of updates) by not delivering a new updates to the subscribing processes for those processes which have not had a monotonic logical clock increment.

When updates are delivered to the client (e.g., process) on a computing node by the monitoring service (or an associated computing service), the updates are totally ordered and consistent. Therefore, clients do not need to process the complete set of updates for the global history but rather may only process a subset of the updates that may be of particular interest to the given client or process.

When two or more processes on a single computing node are using the monitoring service for the selection of a subset of the globally monitored history, ensuring the causal delivery and consistency of the global history is reduced to only being done one time per computing node and not for every process participating in the distributed system computation. This is because the monitoring service on each computing node maintains the global history and parses out subsets of the global history to corresponding process that share the computing node on which the monitoring service is active.

In certain examples, the distribution of the subsets of the global history is accomplished on the computing node through shared memory which is consistent and reliable.

When an update happens on a particular process (e.g., the local history is updated), the update of the local history is communicated once via the shared memory on the computing node (which is consistent and reliable). The monitoring service on the computing node then ensures that the update is published to the global history of the distributed computing system.

In certain example embodiments, publications for a local history for a process may be provided through the corresponding service that is running on the computing node of the process.

In certain example embodiments, an asynchronous distributed computing system includes a plurality of computing nodes. Each of the nodes typically includes multiple computer processes that are part of the distributed system. A totally ordered global view of the distributed system is maintained. The view is made up of locally views that are maintained by each process. The totally ordered global view is updated by a controller service that runs on one of the computing nodes. The computer processes send their local views (or updates thereof) to the controller service that then updates the totally ordered global view. Each one of the computing nodes includes a monitoring service that stores the totally ordered global view in shared memory on that computing node. The monitoring service on each of the computing nodes then allows processes on that node to subscribe to specific portions of the totally ordered global view. In certain examples, the processes are only notified when the corresponding logical clock for that process is incremented (e.g., when a new event is generated, sent, received, etc). By separating the maintenance and updating of the totally ordered global view on a node basis as opposed to a process basis, the system can more easily grow as more and more cores, processors, and systems are added to the distributed system.

In certain example embodiments, the totally ordered global view of the system is stored in shared-cache memory of each computing node. By storing the totally ordered global view in shared cache memory each core within the computing node can quickly access the totally ordered global view or specific portions thereof.

Figure 8:
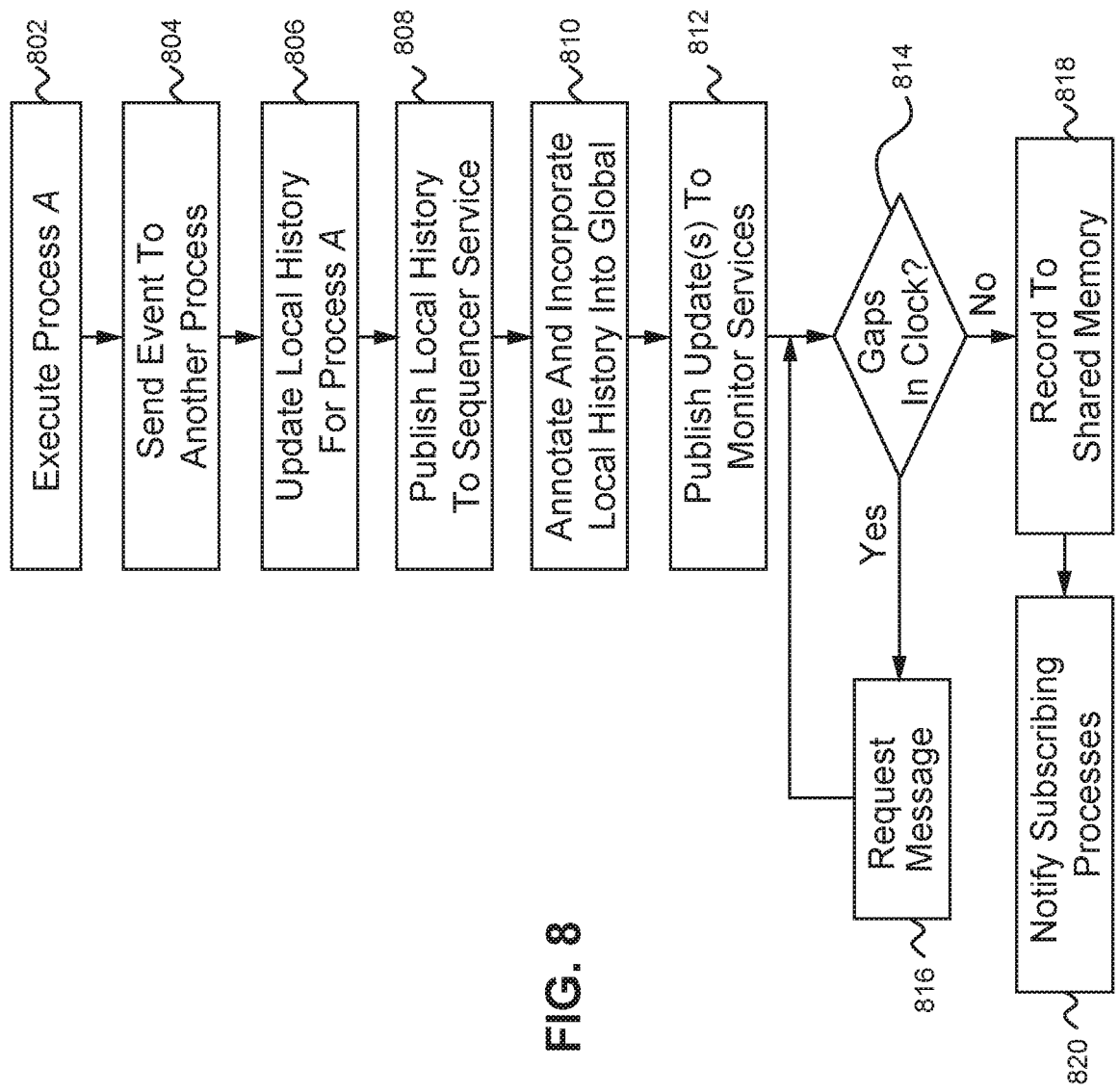
FIG. 8 is an example flow chart showing example processing that occurs in an example distributed computing system.

FIG. 8 is an example flow chart showing example processing that occurs in an example distributed computing system.

In an example distributed computing system a process A on one of the computing nodes within the system is executed in step 802. The execution of process "A" results in a send event, which is then sent in step 804.

The send event correspondingly increments the logical clock of the process and the local history of that process is updated in step 806. The updated local history (e.g., the newly created message) for process A is then published or sent to a sequencer service in step 808.

In step 810, the sequencer service for the distributed system receives the local history update and incorporates the updates into the global history of the distributed system. This process may include annotating the updated messages (or events) with the monotonic logical clock maintained by the sequencer service and then inserting the messages into the global history.

In step 812, the messages added to the global history are published (e.g., immediately) to all of the monitor services within the distributed system. As discussed herein, such publishing may involve transmitted the message over a computer network to other hosts within the distributed system.

In step 814, upon reception of the updates from the sequencer service, each of the monitor services (e.g., that are present on each computer node in the system) checks to see if there any gaps in the logical clock of the global history that has been newly published.

If there are gaps detected within the logical clock, then the monitor service for that node requests the missing messages in step 816. The monitor service correspondingly may queue the updates that it did receive until the missing messages are received.

If there are no gaps in the logical clock of the updates that are received, then the updates (e.g., messages) are recorded into shared memory of the computing node of the corresponding monitor service in step 818.

In step 820, processes on each of the computing nodes may be notified that an update has been entered for a particular subset (e.g., a partial subset) of the stored global history that is contained in the shared memory of the computing node. In certain examples, the monitoring service of the respective computing nodes can accept subscription requests from each one of the processes on the corresponding computing node to monitor a particular section of the global history.

The techniques described above of allowing processes on a computing node to be concerned with particular sections of the global history can be advantageous because in an asynchronous distributed computing environment the maintenance of the global history (e.g., the totally ordered view) is accomplished at a host level (e.g., a computing node) instead of the process level. Furthermore, at the host level, host reliable communication (e.g., via shared and signals) can be used to distribute the subsets to the respective processes that are executing on the local computing node. This can assist in avoiding delivery, processing, and/or discarding of unwanted parts of the global history by all of the processes on a given host. This therefore can enable a more efficient use of multi-core technology in distributed systems. These techniques are facilitated by the lossless causal delivery guarantee of each one of the hosts within the distributed system.

The techniques described herein may be applied in many different areas of technology including, for example, operating system design, predictive modeling systems, debugging systems, electronic trading systems or platforms.

In terms of electronic trading, a distributed system may be used for an electronic trading platform—e.g., an asynchronous distributed computing system may host an electronic trading platform. For example, each of the clients on the distributed system may correspond to connections provided to brokers or other institutions to the platform. Trades, orders, or the like may be commands or events that are triggered for each process. These orders may correspondingly need to be updated for the other clients (e.g., connections on the system). Such a system may, for example, facilitate the high-speed pairing of buy and sell orders via the causal nature of the overall system. Furthermore, the above noted subscription model for individual processes may be broken down onto a security-by-security basis or securities may be bundled for specific clients (e.g., bonds, stocks, etc may be associated with different client processes). Thus, the system can provide a particular client with updates for a particular security without having to provide all of the updates for the global history to that client. The shared memory nature of each of the computing nodes may facilitate the efficient transfer of this information.

Accordingly, certain techniques herein may be used for electronic trading systems to improving scaling and resilience of those systems for multi-core computing systems. These techniques may also be used to enable new schemes for partitioning workload between multiple processes which may be otherwise monolithic in nature.

Figure 9:
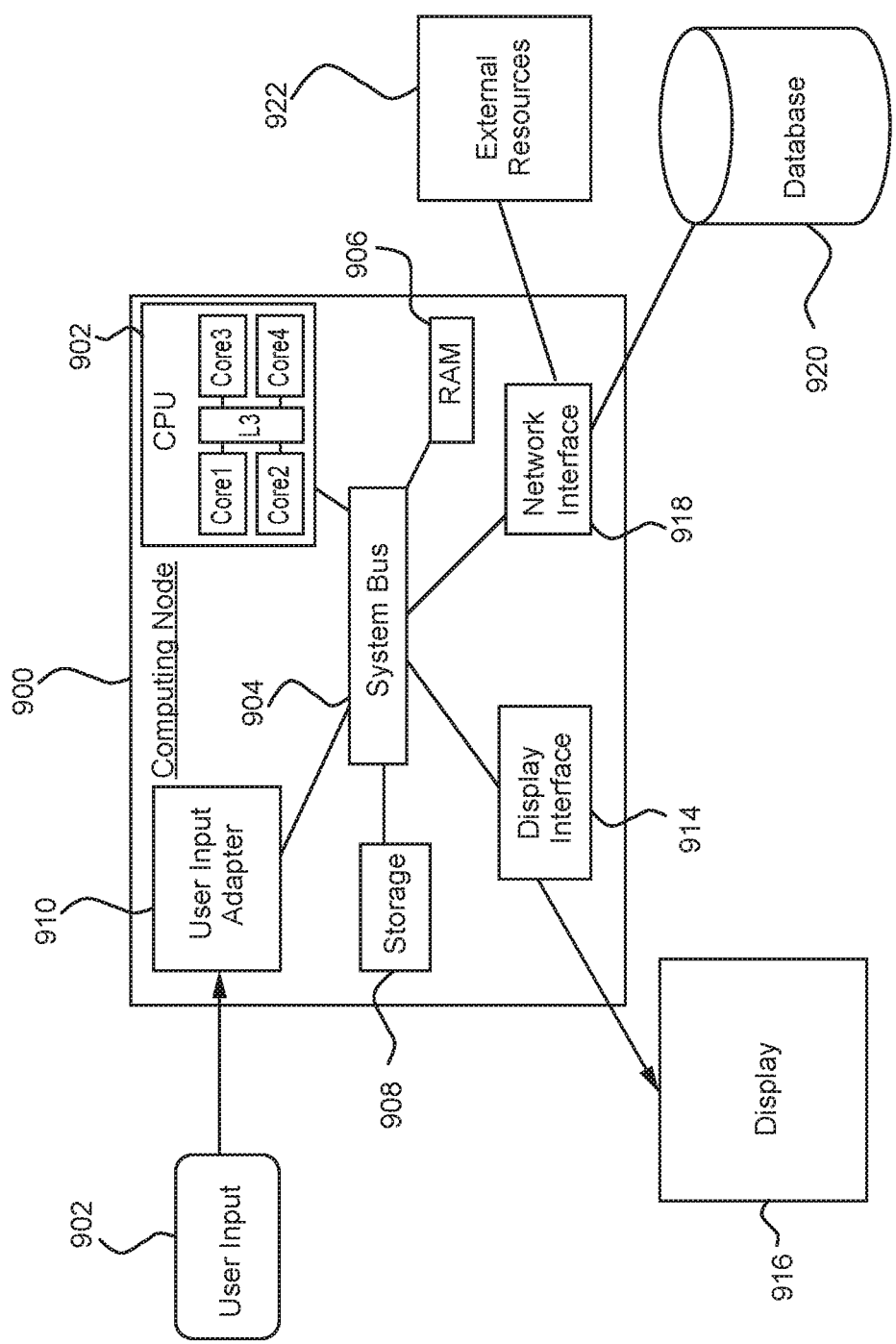
FIG. 9 is a block diagram of an exemplary computing node of a distributed computing system according to certain example embodiments.

FIG. 9 is a block diagram of an exemplary computing node according to certain example embodiments. Such a computing node may be, for example, one of the hosts shown in FIG. 1A or 1B. Computing node 900 includes a central processing unit or CPU 902, a system bus 904 that communicates with RAM 906, and storage 908. The storage 908 can be magnetic, flash based (e.g., for a mobile client device), solid state, or other storage technology. The system bus 904 communicates with user input adapter 910 (e.g., PS/2, USB interface, or the like) that allows users in input commands to computing node 900 via a user input device 912 (e.g., a keyboard, mouse, touch panel, or the like). The results of the processing may be displayed to a user on a display 916 (e.g., an LCD) via display interface 914 (e.g., a video card or the like).

Computing node 900 may also include a network interface 918 (e.g., a transceiver) to facilitate wired (e.g., Ethernet—802.3x) and/or wireless communication (WiFi/802.11x protocols, cellular technology, and the like) with external systems 922 and/or databases 920. External systems 922 may include other processing systems, systems that provide third party services, client devices, server systems, or other computing nodes similar to that of computing node 900 (e.g., to form a distributed computing system).

External systems 922 may also include network attached storage (NAS) to hold large amounts of data. External systems, along with the internal storage and memory, may form a storage system for storing and maintaining information (e.g., graphical models, event log data, etc). Such a system may communicate with users and/or other computing systems to implement the techniques described herein. The database 920 may include relational, object orientated, or other types of databases for storing information (e.g., mappings of event types of graphical model elements).

CPU 902 of computing node 900 includes 4 different cores (core1, core2, core3, and core4) that are all coupled to on-die memory (e.g., L2 or L3 cache memory). In certain examples, the local copy of the global state may be stored in cache memory (e.g., the L3 cache) to provide fast access to client processes on the host computing node. In certain examples, the local copy is stored in RAM 906 and/or storage 908. It will be appreciated that other architecture types may be used. For example, a multiple processor system may be used and the distinct processors may share fast onboard cache memory. Systems with additional, fewer, or single cores are also contemplated.

In other words, the processes, techniques, and the like, described herein (for services, processes, client devices, server, and/or controller systems) may be implemented on a computing node or computing system. Such processes, services, and the like may include program structure that configures or programs a corresponding computing node to carry out aspects according to certain example embodiments.

Example distributed systems in accordance with the techniques described herein may include multiple ones of computing nodes 900 (or similar nodes). In certain examples, communication between these nodes is carried out via network interfaces and customary networking techniques. In other examples, custom high speed data links between systems may be used to facilitate faster (or more reliable) communications between the plural computing nodes of the distributed computing system.

Elements of an example computing system may be coupled to other elements. For example a process may be coupled to storage and/or memory. Coupled may include direct (e.g., using a system bus) or indirect access (e.g., retrieving information via a network).

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A distributed computing system, comprising:
a plurality of computing nodes configured to communicate with one another via an electronic data network, the plurality of computing nodes including at least a first computing node and a second computing node, each one of the plurality of computing nodes including a hardware processor, with the hardware processor of each one of the plurality of computing nodes including a plurality of hardware processing cores that are coupled to common electronic memory,
the first computing node configured to perform operations comprising:
receiving a plurality of electronic data messages;
sequencing each one of the plurality of electronic data messages by generating, for each of the plurality of electronic data messages, a global state electronic data message that includes a logical clock sequence identifier of a logical clock; and
broadcasting the global state electronic data message using the electronic data network,
the second computing node configured to perform operations comprising:
executing a plurality of computer processes, where the plurality of hardware processing cores execute different ones of the plurality of computer processes;
receiving different ones of the global state electronic data messages broadcast from the first computing node;
determining whether there is a gap in the logical clock sequence identifiers of those global state electronic data messages that have been received that indicates that at least one of the broadcast global state electronic data messages is missing;
based on determination that at least one of the broadcast global state electronic data messages is missing, requesting the at least one missing global state electronic data message;
until the at least one missing global state electronic data message is received, queuing global state electronic data messages that have logical clock sequence identifiers after the logical clock sequence identifier of the at least one missing global state electronic data message; and
recording, to the common electronic memory that is accessible by each of the plurality of hardware processing cores of the hardware processor of the second computing node, those global state electronic data messages that do not indicate a gap in the logical clock sequence identifiers.

2. The distributed computing system of claim 1, wherein the request for the at least one missing global state electronic data message is sent to other computing nodes in the distributed computing system to provide the missing global state electronic data message that will fill the gap in the logical clock sequence identifiers that have been received at the second computing node.

3. The distributed computing system of claim 1, wherein the common electronic memory is cache memory located on the same processor die as the corresponding plurality of hardware processing cores.

4. The distributed computing system of claim 1, wherein determining whether there is a gap in the logical clock sequence identifiers of those global state electronic data messages that have been received includes:
perform a validation process for each received global state electronic data message to determine causal dependency with other received global state electronic data messages.

5. The distributed computing system of claim 4, wherein the request for the at least one missing global state electronic data message is based on determination that causal dependency of the messages has not been maintained.

6. The distributed computing system of claim 1, wherein the common electronic memory is configured to store a local copy of a global state, which is comprised of a logical sequence, which is based on respective logical clock sequence identifier, of the global state electronic data messages.

7. The distributed computing system of claim 1, wherein the operations that the second computing is configured to perform further comprise:
selectively delivering messages that are recorded to the common electronic memory to the plurality of computer processes of the second computing node.

8. The distributed computing system of claim 7, wherein the messages are selectively delivered based on which ones of the plurality of computer processes have registered to receive notifications for an identified type of global state electronic data message.

9. The distributed computing system of claim 7, wherein each one of the executing plurality of computer processes on the second computing node has a dedicated portion of shared memory for the respective client computer process, wherein the messages are delivered by writing to the dedicated portion of the shared memory.

10. A distributed computing system, comprising:
an electronic data communications network;
a sequencer computing node that includes a processing system with at least one processor and memory, the processing system configured to:
maintain a global logical clock for the distributed computing system,
execute a sequencer computer process that sequences messages with a corresponding sequence identifier that is based on the maintained global logical clock for the distributed computing system, and
for each sequenced message that is sequenced via the sequencer computer process, broadcast, via the electronic data communications network, the sequenced messages that each include the corresponding sequence identifier; and
at least one monitor computing node coupled to the electronic data communications network, the at least one monitor computing node including a microprocessor that includes a plurality of hardware processing cores, the microprocessor configured to:
execute, across the plurality of hardware processing cores, a plurality of client computer processes,
receive, via the electronic data communications network, the sequenced messages,
determine whether there is a gap in the sequence identifiers of those sequenced messages that have been received that indicates that at least one sequenced message is missing;
based on determination that at least one of the sequenced messages is missing, transmitting a request for the at least one missing sequenced message;
until the at least one missing sequenced message is received, queue other sequenced messages that have sequence identifiers that that indicate being sequenced, by the sequencer process, after the at least one missing sequenced message; and
add, to common electronic memory that is accessible by each of the plurality of hardware processing cores, those sequenced messages that do not indicate a gap in sequence identifiers.

11. The distributed computing system of claim 10, wherein the at least one missing sequenced message is communicated from another monitor computing node of the distributed computing system.

12. The distributed computing system of claim 10, wherein the common electronic memory is cache memory located on the same processor die as the corresponding plurality of hardware processing cores of the microprocessor of the at least one monitor computing node.

13. The distributed computing system of claim 10, wherein the microprocessor of the at least one monitor computing node is further configured to:
for each one of the plurality of client computer processes, maintain, at a dedicated location in memory, a client queue for the respective client computer process,
wherein the plurality of client computer processes are notified in connection with sequenced messages by written a notification to the client queue.

14. The distributed computing system of claim 13, wherein the notification is a pointer to an area of memory of the at least one monitor node that is shared by the plurality of client computer processes.

15. The distributed computing system of claim 13, wherein the notification is a copy of at least some of the data included in a corresponding annotated message received by the at least one monitor node.

16. The distributed computing system of claim 13, wherein the notification is selectively delivered based on an identified attribute of a received sequenced message,
wherein the microprocessor of the at least one monitor node is further configured to store registration data for each one of the plurality of client computer processes, the registration data used to identify sequenced messages that are of interest to the corresponding computer process.

17. The distributed computing system of claim 10, wherein, in the event of failure of the sequencer computing node, the remaining computing nodes within the distributed computing system hold a vote to determine which one of the remaining computing nodes is to become the sequencer computing node,
wherein the vote is based on which one of the remaining computing nodes has a locally stored version of the global state with the highest logical clock.

18. A method comprising:
maintaining a logical clock for a distributed computing system that includes a plurality of computing nodes that communicate using an electronic data communications network that includes a sequencer computing node and a plurality of monitor computing nodes, each one of the of the plurality of monitor computing nodes including a microprocessor that includes at least two computing cores that share common memory;
sequencing, on the sequencer computing node, each one of a plurality of electronic data messages by generating, for each of the plurality of electronic data messages, a logical clock sequence identifier of a logical clock;
publishing, using the electronic data communications network, sequenced electronic data messages that each include a respective logical clock sequence identifier;
executing, on a first monitor computing node of the plurality of monitor computing nodes, a plurality of computer processes by using the at least two computing cores;
receiving, at the first monitor computing node, different ones of the sequenced electronic data messages that have been published;
determining whether there is a gap in the logical clock sequence identifiers of those sequenced electronic data messages that have been received that indicates that at least one of the sequenced electronic data messages is missing;
based on determination that at least one of the sequenced electronic data messages is missing, requesting the at least one missing sequenced electronic data message;
until the at least one missing sequenced electronic data messages is received, queuing other sequenced messages that have sequence identifiers that that indicate being sequenced, by the sequencer computing node, after the at least one missing sequenced message; and
recording, to the common memory that is accessible by the at least two computing cores, those sequenced electronic data messages that do not indicate a gap in logical clock sequence identifiers.

19. The method of claim 18, wherein the at least one missing sequenced message is communicated from another monitor computing node of the distributed computing system.

20. The method of claim 18, wherein the common memory is cache memory located on the same processor die as the two computing cores.

21. The method of claim 18, further comprising:
selectively delivering messages that are recorded to the common memory to the plurality of computer processes of the second computing node.

* * * * *